(12) United States Patent
Lucas et al.

(10) Patent No.: US 10,030,963 B2
(45) Date of Patent: Jul. 24, 2018

(54) MULTIDIMENSIONAL ANGLE DETERMINATION USING FINE POSITION SENSORS

(71) Applicant: Raytheon Company, Waltham, MA (US)

(72) Inventors: Morrison R. Lucas, El Segundo, CA (US); John H. Steele, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 298 days.

(21) Appl. No.: 14/872,353

(22) Filed: Oct. 1, 2015

(65) Prior Publication Data

US 2017/0097224 A1 Apr. 6, 2017

(51) Int. Cl.
*G01B 7/30* (2006.01)
*G01D 5/20* (2006.01)

(52) U.S. Cl.
CPC ............. *G01B 7/30* (2013.01); *G01D 5/2046* (2013.01)

(58) Field of Classification Search
CPC ........ G01B 7/30; G01D 5/2046; G01D 5/206; G01L 3/109
See application file for complete search history.

(56) References Cited

U.S. PATENT DOCUMENTS

| 4,270,077 A | 5/1981 | Swartz et al. |
| 4,360,730 A | 11/1982 | Breslow |
| 5,293,776 A | 3/1994 | Takegami et al. |
| 5,965,806 A | 10/1999 | Antcliff et al. |
| 6,131,547 A | 10/2000 | Weber et al. |
| 7,757,547 B2 | 7/2010 | Kageyama et al. |
| 8,717,041 B2 | 5/2014 | Steele |
| 2010/0308808 A1* | 12/2010 | Yamagata ............... G01D 1/00 324/207.25 |
| 2011/0227562 A1* | 9/2011 | Sasaki .................. G01D 5/2452 324/207.25 |
| 2013/0060490 A1* | 3/2013 | Ameil ..................... G01L 3/109 702/41 |

(Continued)

FOREIGN PATENT DOCUMENTS

| DE | 19818799 A1 | 6/1999 |
| DE | 102013207621 A1 | 10/2014 |

(Continued)

OTHER PUBLICATIONS

International Search Report and Written Opinion from related PCT Application No. PCT/US2016/032506 dated Jul. 29, 2016.

*Primary Examiner* — Dale E Page
*Assistant Examiner* — Changhyun Yi
(74) *Attorney, Agent, or Firm* — Burns & Levinson, LLP; Joseph M. Maraia (57) ABSTRACT

A method for measuring a large shaft rotation angle utilizes one or more cams attached to the shaft. Each cam shape is designed to have one or more detectable harmonics when rotated. Multiple harmonics in a single cam or amongst multiple cams may have a particular order. Pairs of fine position sensors, positioned at opposing sense angle positions relative to the cam(s) measure displacement of the cam during rotation. The data from the position sensors is then analyzed, with a processor, to determine the large shaft rotation angle and angular displacement relative to an ideal axis of rotation.

20 Claims, 9 Drawing Sheets

(56) References Cited

U.S. PATENT DOCUMENTS

2014/0214294 A1* 7/2014 Mori .................. F16H 61/0437
                                                                                    701/60
2015/0253211 A1    9/2015 Lisseman et al.

FOREIGN PATENT DOCUMENTS

| EP | 0698728 B1 | 2/1996 |
|---|---|---|
| EP | 1156191 A1 | 11/2001 |
| WO | 0242713 A2 | 5/2002 |

* cited by examiner

MULTIDIMENSIONAL ANGLE DETERMINATION USING FINE POSITION SENSORS

GOVERNMENT RIGHTS

This invention was made with Government support via Contract No. (Withheld) awarded by the (Withheld). The Government has certain rights in this invention.

BACKGROUND

A number of applications require high precision measurement of the angle of an object constraint by a rotating joint. For example, high precision gimbaled telescope pointing applications typically require microradian class angle measurements on each of two rotating axes.

Unlike flexure-based mechanisms, which typically allow angular travel of a few degrees, objects constrained by a rotating joint require precise measurement of large angles, up to 360 degrees.

SUMMARY

Described herein is a system and method for measuring large Gimbal angles using high precision Fine Position Sensors (FPSs). A method for measuring a large shaft rotation angle utilizes one or more cams attached to the shaft. Each cam shape is designed to have one or more harmonics detectable during rotation. Multiple harmonics in a single cam or amongst multiple cams may have a particular order. Pairs of fine position sensors, positioned at opposing sense angles relative to a cam, measure the displacement of the cam during rotation. The data from the position sensors is then analyzed, with a processor, to determine the large shaft rotation angle and angular displacement relative to an ideal axis of rotation.

In an embodiment, a method for measuring a large shaft rotation angle includes providing a cam with one or more harmonics. Each of the harmonics has a particular order. The method further includes rotating the cam along an axis of rotation. The method further includes determining, with each of a plurality of pairs of fine position sensors, a differential radial measurement at a particular sense angle defined by a position of the pairs of fine position sensors, within a plane substantially perpendicular to the axis of rotation. The method further includes analyzing, with a processor, each of the differential radial measurements to determine the large shaft rotation angle.

Analyzing includes determining translation along two axes perpendicular to the axis of rotation. The cam can have two or more harmonics. The shaft can include providing two or more cams, sharing a common axis of rotation, and analyzing each of the differential radial measurements can also determine at least one of a tip and a tilt of the common axis of rotation. Each of the two or more cams can have harmonics of mutually exclusive orders. Each of the two cams can have a single harmonic. The particular orders of each of the harmonics can be relatively prime. The particular orders of each of the harmonics can be odd.

A system for measuring a large shaft rotation angle can include a cam having one or more harmonics, wherein each of the harmonics has a particular order. A rotor is configured to rotate the cam along an axis of rotation. A plurality of pairs of fine positions sensors are configured to determine a differential radial measurement at a particular sense angle defined by a position of the pairs of fine position sensors, within a plane substantially perpendicular to the axis of rotation. A processor is configured to analyze each of the differential radial measurements to determine the large shaft rotation angle. The processor can be further configured to determine translation along two axes perpendicular to the axis. The cam can have two or more harmonics.

In an embodiment, the cam can be two or more cams, sharing a common axis of rotation, and the processor can be further configured to analyze each of the differential radial measurements further determines at least one of a tip and a tilt of the common axis of rotation. Each of the two or more cams has harmonics of mutually exclusive orders. Each of the two cams can have a single harmonic.

According to one aspect of the disclosure, a method for measuring a large shaft rotation angle, the method comprises: A) providing a cam mechanism having one or more shape features defining harmonics, B) rotating the cam along an axis of rotation; C) determining, with a plurality of position sensors, a differential measurement at a particular sense angle defined by positions of the plurality of sensors, relative to the axis of rotation; and D) analyzing, with a processor, each of the differential measurements to determine a large shaft rotation angle.

According to another aspect of the disclosure, a system for measuring shaft rotation angle, the system comprises: a shaft rotatable relative to an axis of rotation; a cam mechanism, coupled to the shaft, the cam mechanism having features defining at least one harmonic; a plurality of sensors positioned relative to the cam mechanism to determine a differential measurement at a particular sense angle defined by a position of the pairs of position sensors relative to the axis of rotation; and a processor configured to determine with a plurality of position sensors, a differential measurement at a particular sense angle defined by a position of the pairs of sensors relative to the axis of rotation.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Due to imprecision in manufacturing, the axis of rotation of the shaft to which the mirrors are attached is always wobbling. The rotor uses ball bearings to rotate the shaft. The balls of ball bearings, however, are circular only to the micron level, which can cause the axis of rotation to wobble on the order of μrad. Generally, measurement systems cannot compensate for such shaft error. However, if the error is known the error can be corrected or reported. The present system and method can provide such a measurement of the error, such that it can be corrected or reported.

Figure 1:
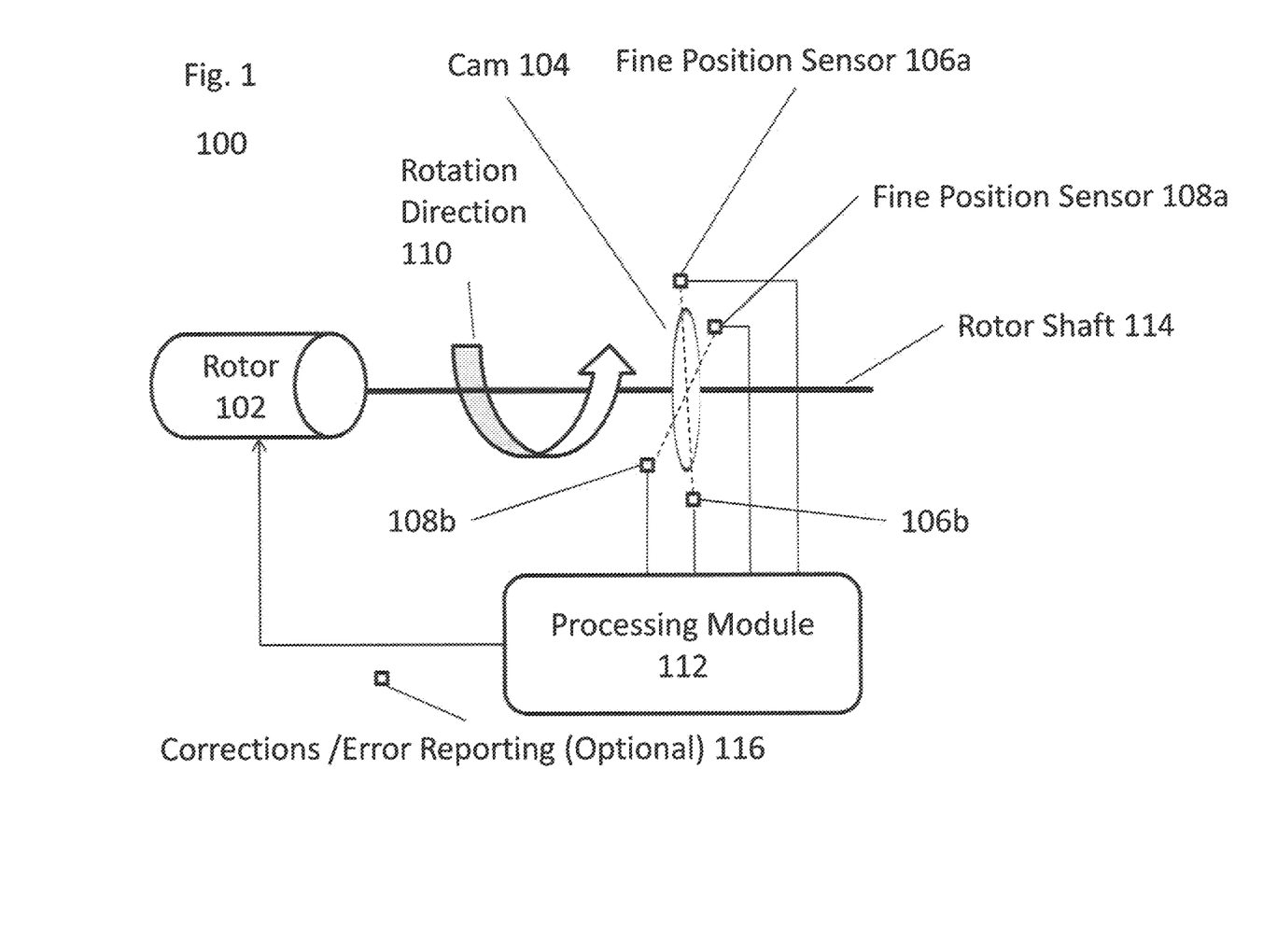
FIG. 1 is a block diagram illustrating conceptually a system embodiment in accordance with the disclosure.

FIG. 1 is a conceptual diagram 100 illustrating an example embodiment in accordance with the disclosure. A cam 104 is coupled to a rotor shaft 114. While the cam 104 is shown to be flat, a person of ordinary skill in the art can recognize that cam 104 has a depth extending longitudinally along its axis of rotation. A rotor 102 rotates the rotor shaft 114 in a rotation direction 110. The rotor shaft 114 also causes the cam 104 to rotate.

Fine position sensors (FPSs) 106a-b and 108a-b are positioned in substantially the same plane as cam 104 but about the perimeter thereof to detect the radial displacement movement of the cam 104 relative to shaft 114. Each FPS 106a-b and 108a-b is made up of individual read heads (106a, 106b, 108a, and 108b, respectively). As is described in further detail below, additional FPSs can be employed, however, for simplicity, FIG. 1 shows only two FPSs. Each pair of read heads determines the distance from the read head to the cam 104 along a line between the two read heads, which is shown in FIG. 1 by the dotted lines between each respective read head pair.

The present system and method describes a system and processing method for high precision (e.g., to the precision of less than μrad (microradians)) multi-dimensional (e.g., rotation and runout wobble) measurement of a rotating shaft using high-precision Fine Position Sensors (FPSs). Exemplary FPSs suitable for use with the systems and methods disclosed herein are described in US Patent Publication US 201110308296 A1 or are commercially available from Blue Line Engineering, Colorado Springs, Colo., for example, Each FPS has two read heads. Each respective read head provides a high frequency current in a particular pattern and causes an eddy current. The eddy current, in turn, causes a magnetic field. The gain measured at the read head depends on how close the read head is to the object being measured. Typically, the FPSs can sense across a 2 millimeter (mm) distance to 22-bits of precision. This allows measurement at the nanometer (nm) level.

Hardware or software logic within the FPS associated with the read heads then calculates an X and Y position of the cam based on the readings from the read heads, A processing module 112 receives the X and Y position of the cam from the FPSs 106a-b and 108a-b and calculates the angular position of the rotor shaft 114. If an error in the angular position of the shaft is detected, processing module 112, then either reports an error 116 or corrections 116 to the rotor 102

The present technology employs a carefully designed mechanical cam and an arrangement of pairs of FPSs. The mechanical cams used by the technology have designed cam shapes, which when rotated are characterized by one or more harmonics. Each such harmonic has an order.

Figure 2A:
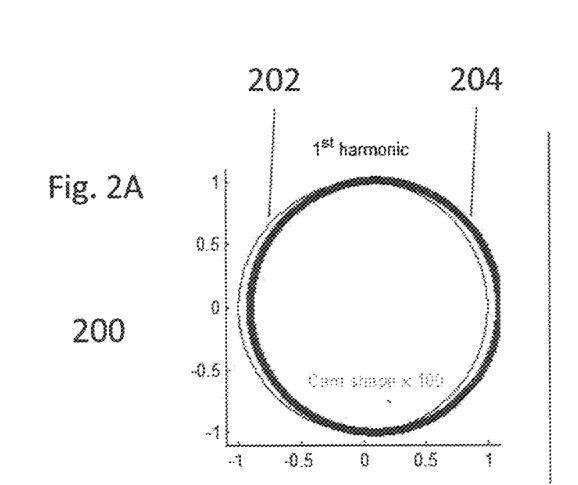
FIGS. 2A-D are diagrams illustrating conceptually example embodiments of radial cam shapes having exaggerated cam deviations.
Figure 2B:
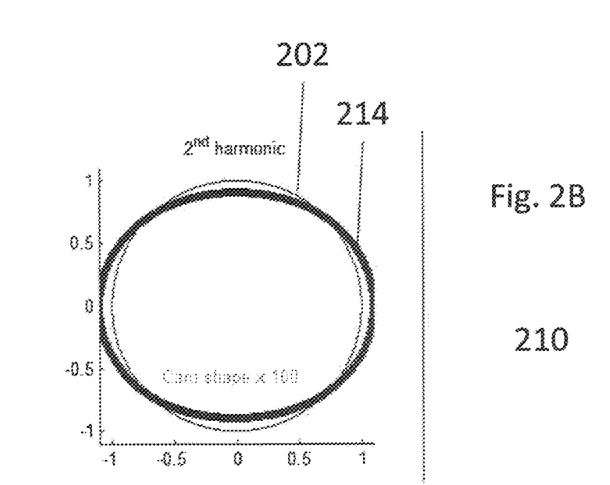
Figure 2C:
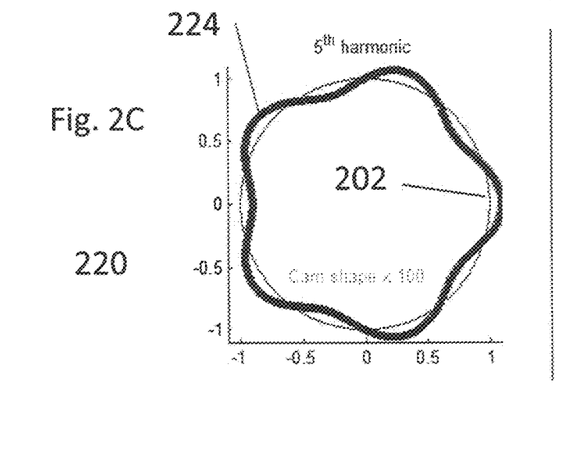

FIGS. 2A-D are diagrams 200, 210, 220 and 230, respectively, illustrating example embodiments of radial cam shapes having exaggerated cam deviations (not to scale). The cam deviations are exaggerated for purposes of illustration, but a person of ordinary skill in the art would understand how to provide cam shapes having normally proportioned harmonics. For example, a $0^{th}$ order harmonic cam 202, illustrated by FIG. 2A, is simply a circular cam. A $1^{st}$ order harmonic cam 204, illustrated by FIG. 2A, is a cam having one lobe. A $2^{nd}$ order harmonic cam 214, illustrated by FIG. 2B, is a cam having two lobes, A $5^{th}$ order harmonic cam 224, illustrated by FIG. 2C, has five lobes. A person of ordinary skill in the art can recognize that an $n^{th}$ order harmonic cam has n lobes. In a cam having one harmonic, repeat measurements can be performed to correlate to the order of the harmonic. For example, the $5^{th}$ order harmonic cam 224 of FIG. 2C has repeat measurements every $\frac{1}{5}^{th}$ of a rotation of the cam 224. A person of ordinary skill in the art can recognize that an $n^{th}$ order harmonic causes repeat measurements every $1/n^{th}$ of a rotation. Repeat measurements prevent processing from determining the unique angular position of the cam.

Figure 2D:
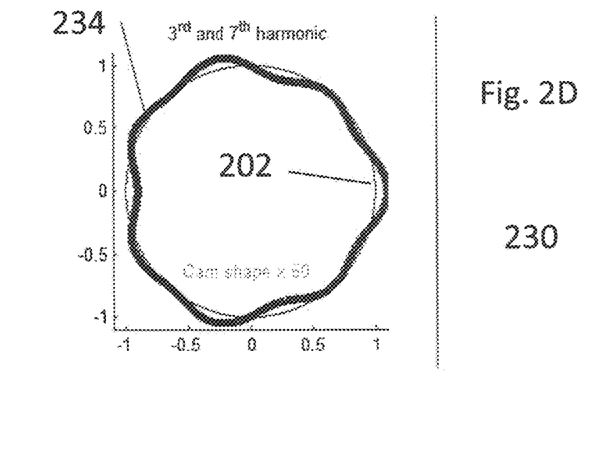

A cam by design, however, may be characterized by multiple harmonics when rotated. Adding a second harmonic prevents such repeat measurements, and allows each position measurement to correspond to a unique angle. For example, as illustrated by FIG. 2D, a $3^{rd}$ and $7^{th}$ order harmonic cam has three lobes corresponding to the third order harmonic and seven lobes corresponding to the seventh order harmonic. The lobes are not symmetrical in this case as the multiple harmonics affect each other, and no repeat measurements are possible as long as the harmonic orders are odd and relatively prime.

Figure 3:
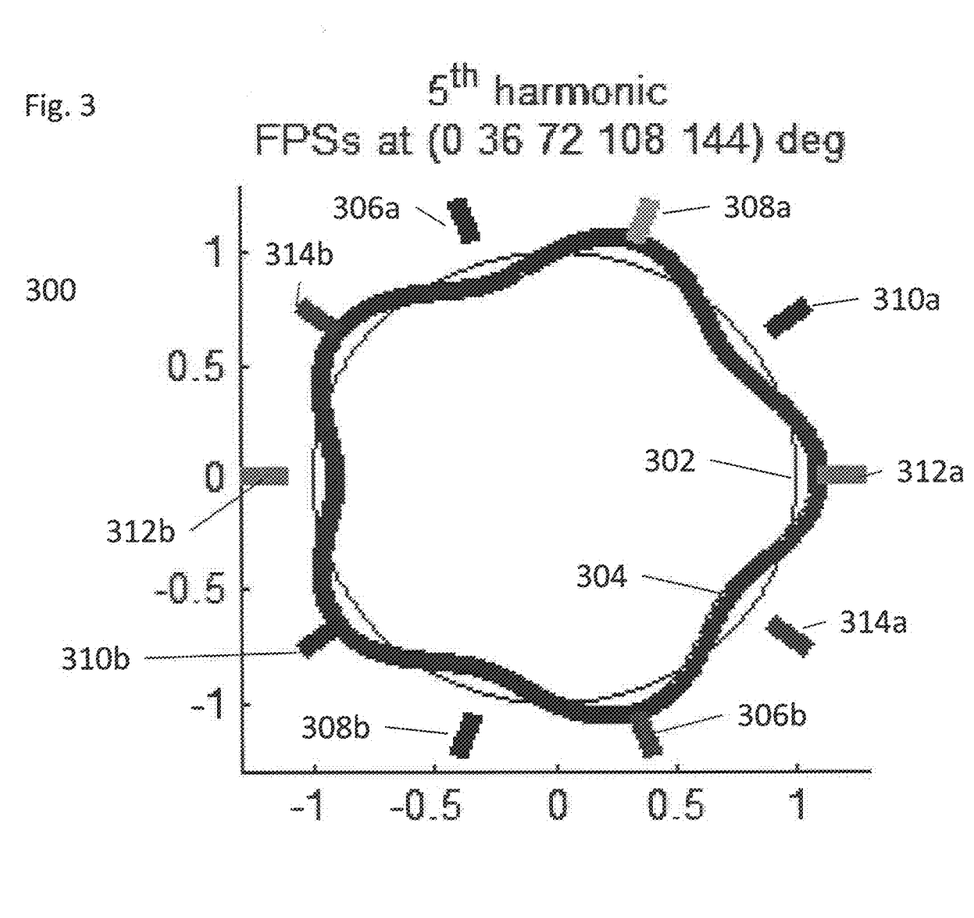
FIG. 3 is a diagram illustrating conceptually placement of fine position sensors relative to a fifth order harmonic cam.

To determine angular position on one axis of rotation, multiple differential FPSs, at known angles, can be used to fit the sine and cosine terms of a known harmonic using a least squares fit. The sine and cosine terms can be used to determine phase. Differential FPSs, with heads arranged 180 degrees around a cam, can generally only sense the rotation of odd harmonics, FIG. 3 is a diagram 300 illustrating conceptually the approximate placement of FPSs 306a-b, 308a-b, 310a-b, 312a-b, and 314a-b relative to a fifth order harmonic cam 304. Each FPS (e.g., 306a-b) comprises a pair of individual heads (e.g., sensor head 306a and sensor head 306b), FPSs 306a-b, 308a-b, 310a-b, 312a-b, and 314a-b are placed radially around the circumference of the cam 304. The FPSs 306a-b, 308a-b, 310a-b, 312a-b, and 314a-b are further placed in the same plane or substantially the same plane. The axis of rotation of the cam is substantially perpendicular to the plane in which the FPSs lie. The FPS sensors 306a-b, 308a-b, 310a-b, 312a-b, and 314a-b are differential sensors that measure the observed position difference between a pair of corresponding read heads. The heads of the FPS sensor pairs 306a-b, 308a-b, 310a-b, 312a-b, and 314a-b are positioned on opposite sides of the cam 304. For example, the head of FPS 306a is positioned on the opposite side of the cam 304 relative to the head FPS 306b. Similar opposite positional relationships exist between the heads of FPS sensors 308a-b, 310a-b, 312a-b, and 314a-b.

Figure 4:
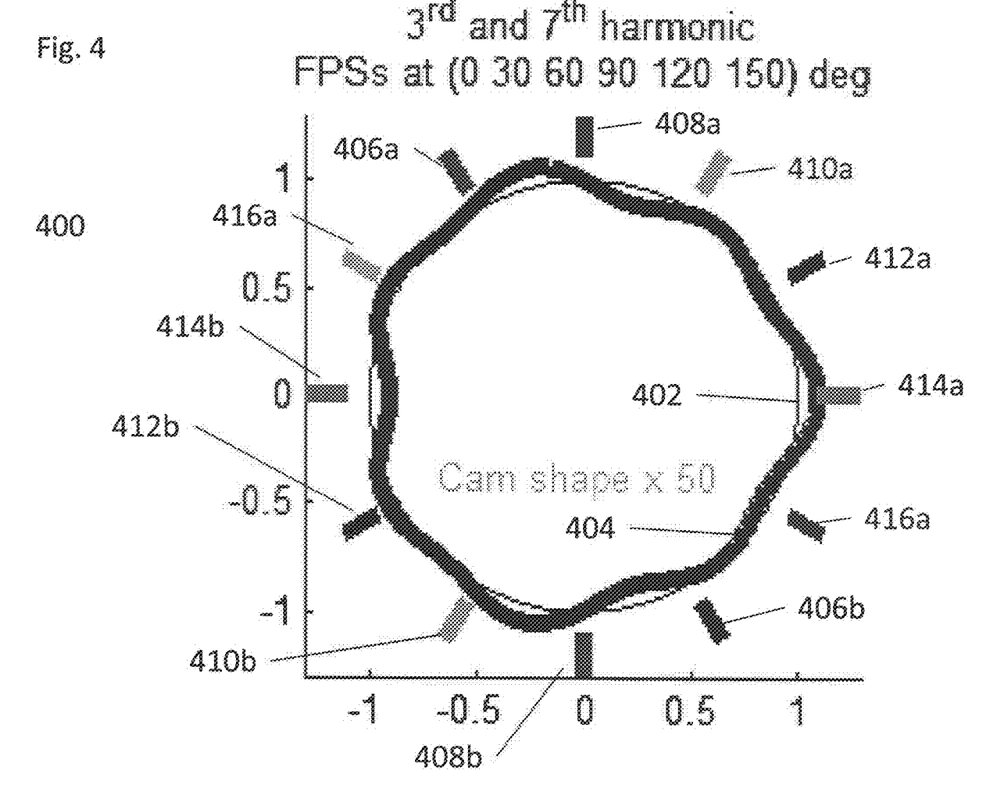
FIG. 4 is a diagram illustrating conceptually an example cam having six FPSs and two harmonics.

FIG. 4 is a diagram 400 illustrating an example cam 404 having six FPSs and two harmonics. The rotation of the $1^{st}$ cam harmonic is typically indistinguishable from bearing runout, and cannot be reliably used to determine rotation. Moreover, the presence of bearing runout causes motion that looks like a $1^{st}$ order cam rotation. The measured phase of a higher order harmonic cam cannot be unambiguously mapped to a rotation angle. However, if two, relatively prime (e.g. $3^{rd}$ and $7^{th}$) harmonic orders are used, the combination can be used to unambiguously determine a rotation. Therefore, in a single cam 404, two, relatively prime, odd harmonics, (e.g. $3^{rd}$ and $7^{th}$) can be superimposed onto a cam. Six differential FPSs 406a-b, 408a-b, 410a-b, 412a-b, 414a-b, and 416a-b can determine the sine and cosine terms of the two cam harmonics, plus the $1^{st}$ harmonic (driving the bearing runout). These measurements can then be combined to determine an unambiguous angular position, plus X and Y runout terms.

Figure 5:
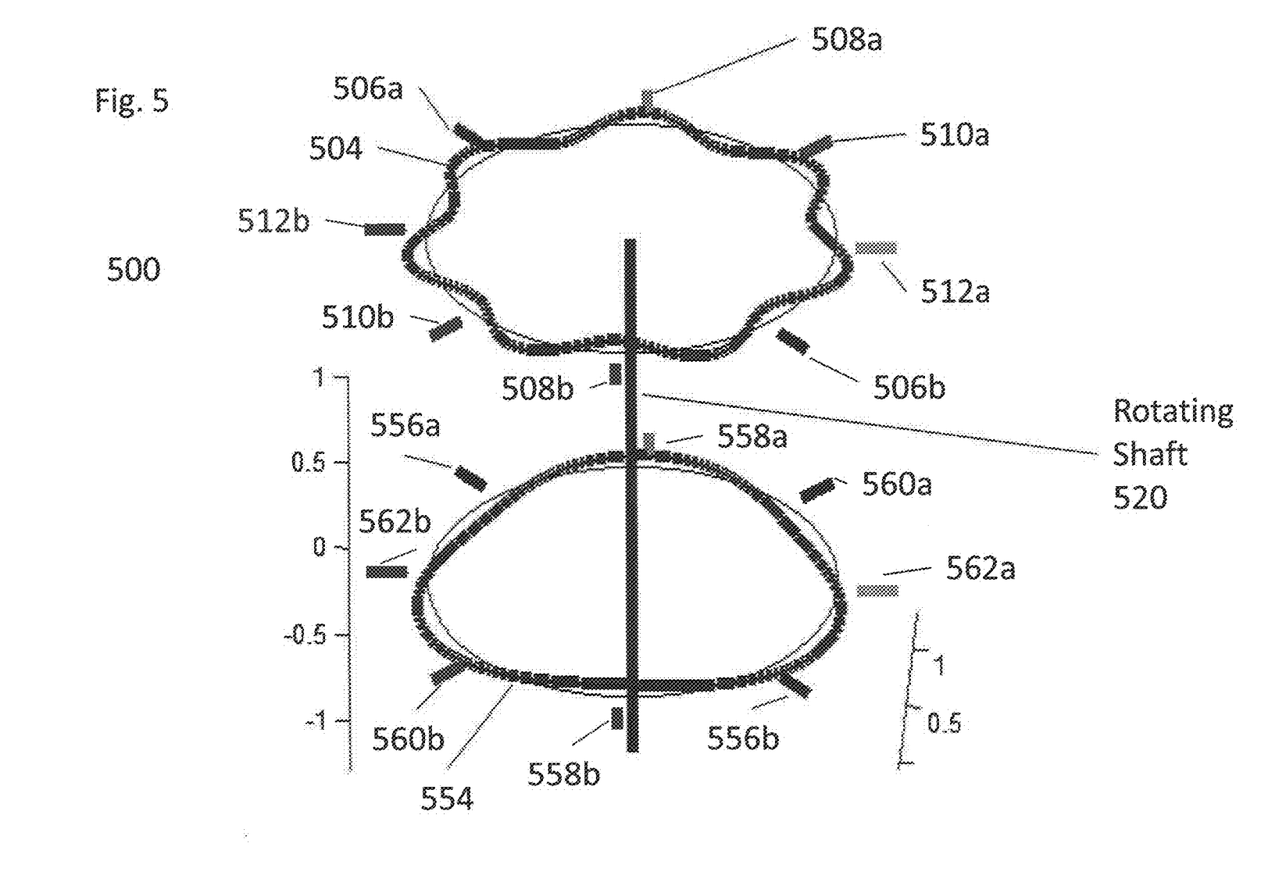
FIG. 5 is a diagram of an illustrative embodiment having a first cam and a second cam coupled to rotating shaft and sharing a common axis of rotation in accordance with the disclosure.

FIG. 5 illustrates conceptually an example embodiment system 500 having a first cam 504 and a second cam 554 coupled to rotating shaft 520 and sharing a common axis of rotation. The first cam 504 and second cam 554 are seperated by a distance along the rotating shaft 520, X and Y runout terms from each cam can be used to determine angular runout of the overall shaft. In this embodiment, the number of differential FPS heads needed can be reduced if each each respective cam 504 and 554 has only one harmonic, and if each of the cams 504 and 554 have different, odd, and relatively prime harmonics.

After the FPS sensors collect data from the cam(s), a processor analyzes the collected data to determine the angular rotation of the shaft.

First, the processor fits the collected data to find the sine and cosine for the modeled harmonics. The order(s) of the harmonics of each of the cam(s) is known or input to the system, and the position data from the FPSs is used to solve for each modeled harmonic. The system solves for the $1^{st}$ harmonic, plus the added cam harmonics.

The X and Y position of the cam is the cosine and sine terms, respectively, of the $1^{st}$ order harmonic fit. This value can be discarded for many applications. If using a 2 cam configuration the X and Y positions of each can be used to determine the shaft tip/tilt rotation measurements.

The processor then calculates the arctangent (e.g., a tan 2(y co-ordinate, x co-ordinate)) to get the phase of cam harmonics. As is known by a person of ordinary skill in the art, the arctan 2(y,x) is defined by:

$$\operatorname{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases}$$

The processor then performs a two-phase unwrap. For the two-phase unwrap to be successful, the square root of the sum of the squares of the two individual a tan 2 fits must be less than:

$$\frac{\sqrt{\frac{a^2 * b^2}{a^2 + b^2}}}{2}$$

Where:

$$a = \frac{2\pi}{\text{harmonic}_1}$$

$$b = \frac{2\pi}{\text{harmonic}_2}$$

Factors can contribute to errors in the current system. First, bearing runouts and mechanical slop can cause unacceptable performance if not explicitly modeled and removed. By fitting the $1^{st}$ harmonic, however, bearing runout and mechanical &op are no longer significant error contributors.

The FPS itself can cause errors, for example, noise, scale factor, bias, or nonlinearity.

Cam uncertainties, such as unmodeled harmonics, can cause errors. In addition, sensor placement uncertainty can cause errors. However, calibration of the cam harmonics and sensor placement can alleviate these errors.

The described system can also provide a level of redundancy, if needed, Additional FPS sensors can be added around the same cam. If all FPS sensors are operational, the system performance improves. So long as at least the critical number of FPS sensors are operational, system performance will be as expected.

For most precision pointing applications, small changes in a translational position are insignificant. However, if an application required translation, the X and Y values could be used directly for that purpose, allowing for a 5-dimension sensor suite. The addition of a differential FPS sensor with heads on the top and bottom of the cam could add the Z-dimension, leading to a full six-dimensional sensor, measuring X-, Y-, and Z-co-ordinates, rotation angle, tip and tilt.

As the cam spatial frequency increases, the sensed amplitude decreases due to the non-zero sensing region of the FPS head. This limits the number of harmonics that can be used in this configuration. For example, the $511^{th}$ order harmonic (as sometimes seen in inductosyns) is not an ideal harmonic order.

Figure 6:
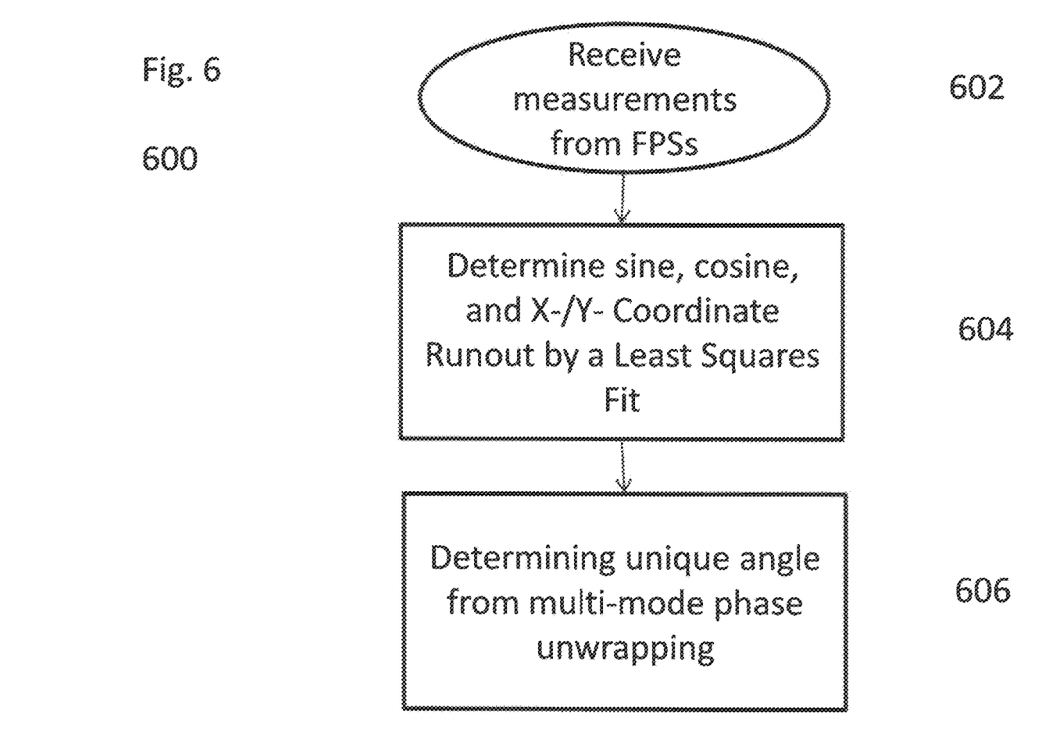
FIG. 6 illustrates conceptually a process of an algorithmic process performed in accordance with the disclosure.

FIG. 6 is a flow diagram 600 illustrating an example embodiment of disclosure. First, a process receives measurements of the cam from FPSs (602). The process then determines sines, cosines, and x- and y-coordinate runout of the rotated cam by using a least squares fit (604). Then, the process determines the unique angle of the cam from multi-mode phase unwrapping (606).

Figure 7:
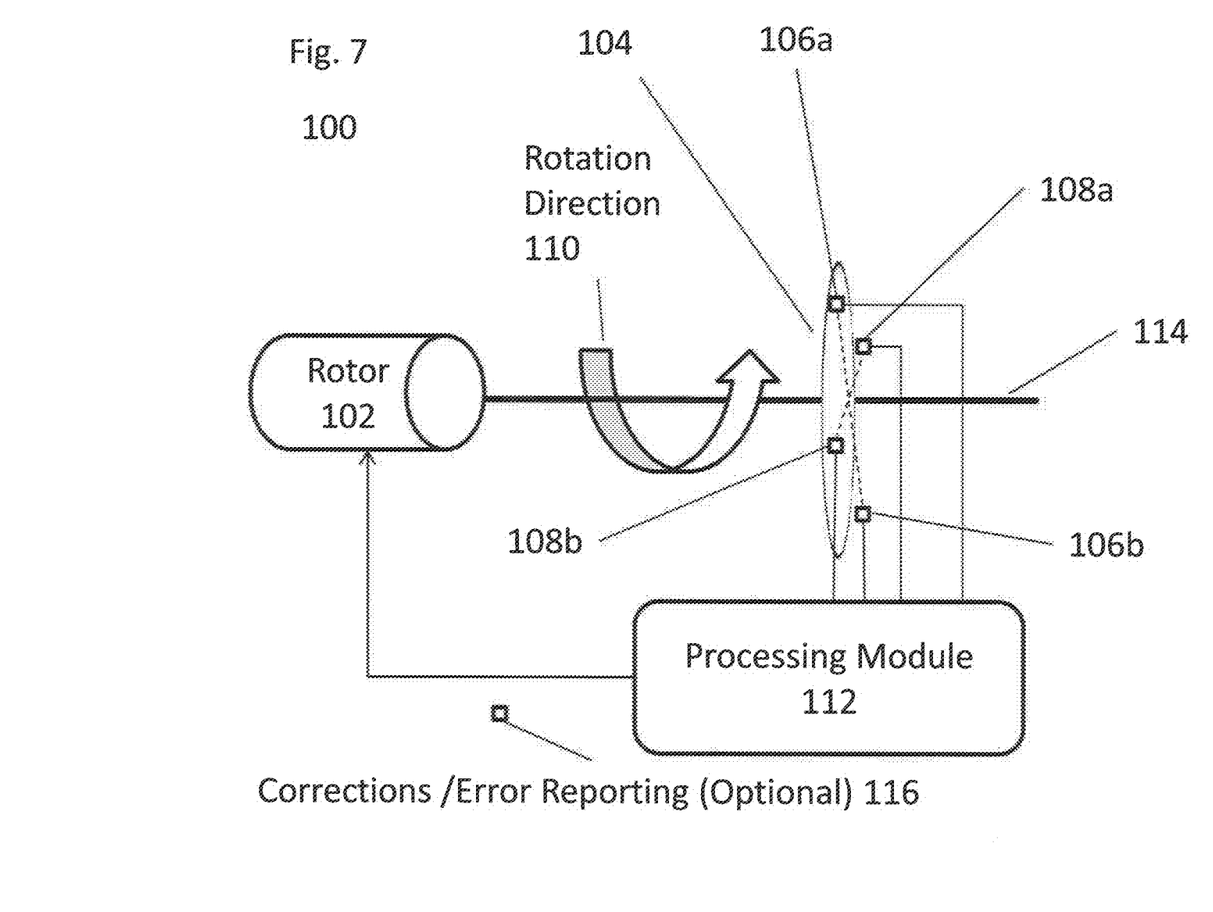
FIG. 7 is a block diagram illustrating conceptually another system embodiment in accordance with the disclosure.

FIG. 7 is a block diagram 100 illustrating another embodiment in accordance with the disclosure. In this embodiment, Fine position sensors (FPSs) 106a-b and 108a-b are positioned radially relative the center of cam 104 but in a plane substantially above or below the plane of cam 104 with the distance from the FRS to the cam plane being parallel with rotor shaft 114. This configuration allows the FPS is to detect the movement of the cam 104 in the Z dimension. Each FPS 106a-b and 108a-b is made up of individual read heads (106a, 106b, 108a, and 108b, respectively). As with FIG. 1 for simplicity, FIG. 7 shows only two pairs of FPSs. Each pair of read heads determines the distance from the read head to the cam 104 along a line between the two read heads, which is shown in FIG. 7 by the dotted lines between each respective read head pair.

In the embodiment illustrated in FIG. 7, cam 104, and any additional cams affixed to rotor shaft 114, have shape features which cause harmonics not just in an X-Y plane perpendicular to shaft 114 but in the Z dimension as well. In this manner, the rotation of the cam 104 about the shaft 114 will cause periodic displacement of a feature of the cam along an axis which is substantially parallel to the axis of rotation of shaft 114. As such, FPS sensors 106 and 108 are positioned not radially opposite each relative to shaft 114 but are positioned vertically along an axis parallel with shaft 114 in order to detect vertical displacement of the harmonic feature as the cam 104 rotates. More than one set of FPS sensors may be used to detect more than one harmonic in a cam 104 having harmonic features defined in the XYZ dimensions.

Figure 8A:
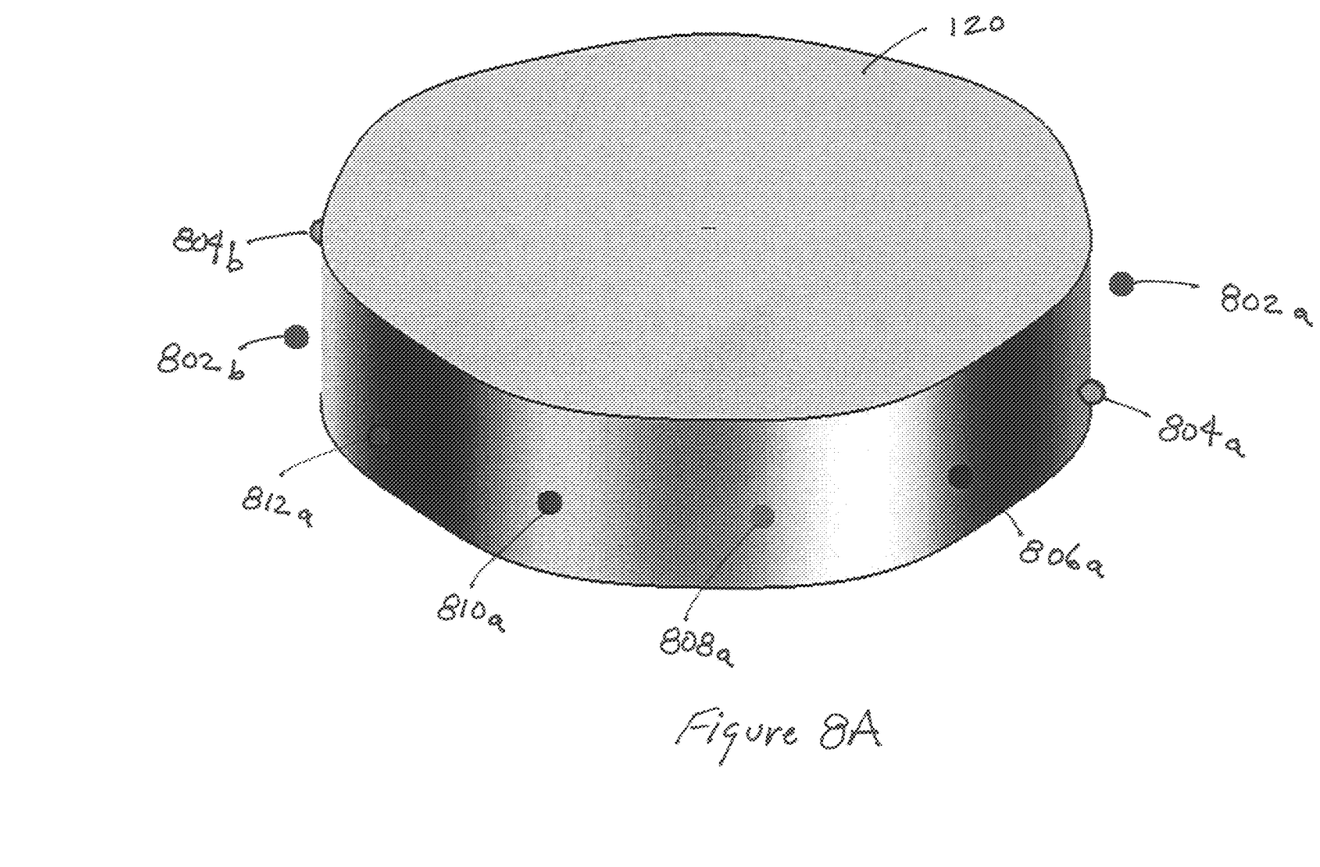
FIG. 8A illustrates conceptually perspective views of an exemplary cam having six FPSs and two harmonics.
Figure 8B:
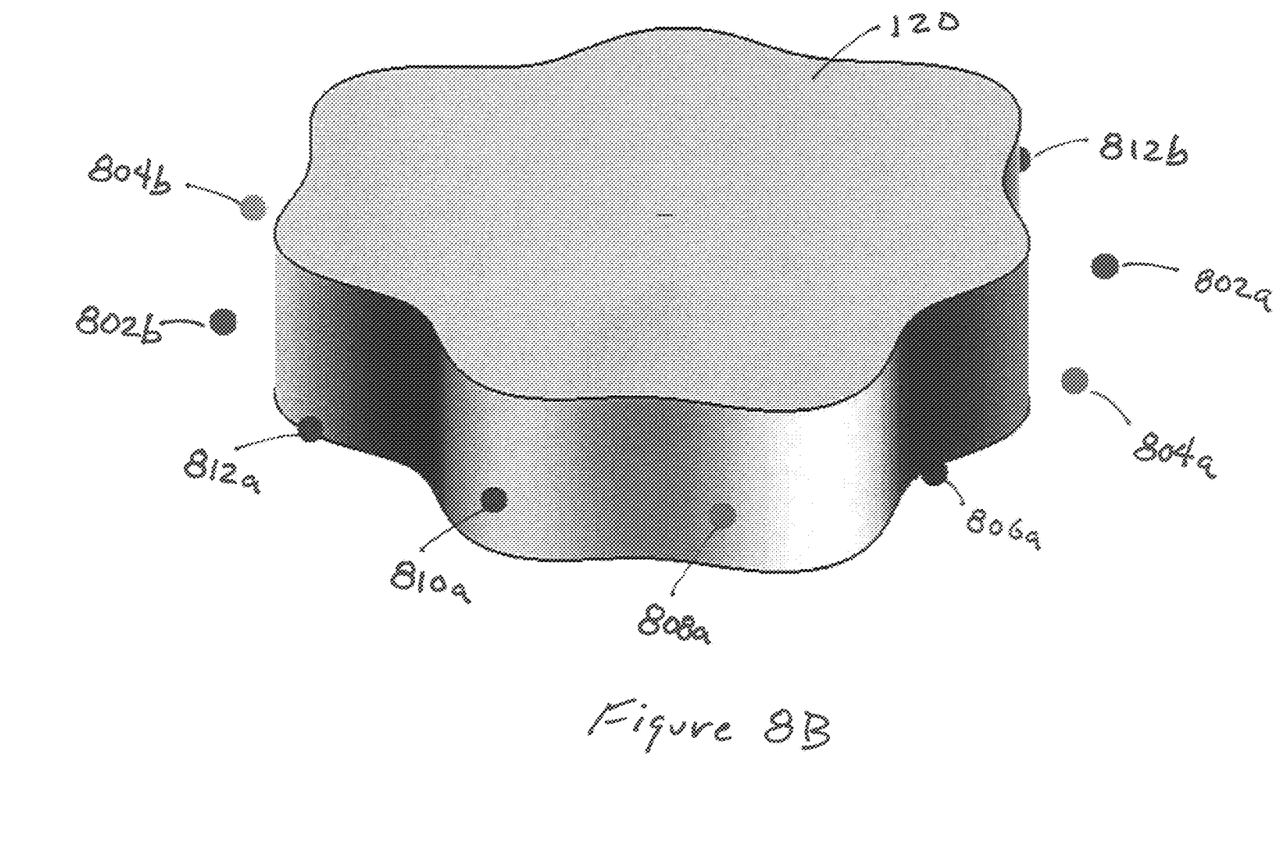
FIG. 8B illustrates conceptually an exaggerated perspective views of the exemplary cam of FIG. 8A.

FIG. 8A illustrates an exemplary cam 120 with multiple pairs of position sensors disposed proximate the peripheral edge of cam 120. FIG. 8B is an exaggerated view of the features defining the various harmonics of cam 120. Cam 120 may have a radius of approximately 10 cm and features defining Harmonic 1, the $3^{rd}$ order, of approximately 1.5 mm amplitude, and, features defining Harmonic 2, $7^{th}$ order, of approximately 1.5 mm amplitude. As illustrated in FIGS. 8A-B, FPS read head pairs 802a-b, 804a-b, 806a-b, 808a-b, 810a-b, and 812a-b, at least one read head of each pair being illustrated conceptually, are disposed around the perimeter of cam 800 in a manner which will enable detection of the harmonic features during rotation.

Hardware or software logic within the FPS associated with the read heads then calculates an effective in-plane tip of the cam based on the readings from the read heads in that plane. A processing module 112 receives the tip measurements of the cam from the FPSs 106a-b and 108a-b and calculates the angular position of the rotor shaft 114. If an error in the angular position of the shaft is detected, processing module 112, then either reports an error 116 or corrections 116 to the rotor 102.

The present technology employs a carefully designed mechanical cam and an arrangement of pairs of FPSs. The mechanical cams used by the technology have designed cam shapes, which when rotated are characterized by one or more harmonics. Each such harmonic has an order.

The above-described systems and methods can be implemented in electronic circuitry, but both analog and/or digital, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device.

The system can include clients and servers. A client and a server are generally remote from each other and typically interact through a communication network. The relationship of client and server arises by virtue of computer programs running on the respective computers and having a client-server relationship to each other.

The components of the system can be interconnected by any form or medium of data communication (e.g., a communication network). Examples of communication networks include circuit-based networks, packet-based networks or any network poultry combination thereof. Packet-based networks can include, for example, the Internet, a carrier internet protocol (IP) network, local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (CPRS) network, HiperLAN), and/or other packet-based networks. Circuit-based networks can include, for example, the public switched telephone network (PSTN), a private branch exchange (PBX), a wireless network (e.g., RAN, blue-tooth, code-division multiple access (CDMA) network, time division multiple access (TEMA) network, global system for mobile communications (GSM) network), and/or other circuit-based networks. Any network topology comprising any of the foregoing may be utilized to implement the concepts disclosed herein.

The transmitting device can include, for example, a computer, a computer with a browser device, a telephone, an IP phone, a mobile device (e,g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for measuring a large shaft rotation angle, the method comprising:
   A) providing a cam mechanism having two or more cams sharing a common axis of rotation, each cam having one or more shape features defining harmonics;
   B) rotating the cam mechanism along the axis of rotation;
   C) determining, with a plurality of position sensors, a differential measurement at a particular sense angle defined by positions of the plurality of sensors relative to the cams; and
   D) analyzing, with a processor, each of the differential measurements to determine a large shaft rotation angle.

2. The method of claim 1, wherein the cam mechanism is disposed in a plane perpendicular to the axis of rotation and wherein the plurality of position sensors are disposed within the perpendicular plane or in a plane parallel with the perpendicular plane.

3. The method of claim 1, wherein one of the cams having shape features defining a plurality of harmonics, each harmonic being of a particular order.

4. The method of claim 3, wherein the particular orders of each of the harmonics are relatively prime.

5. The method of claim 3, wherein the particular orders of each of the harmonics are odd.

6. The method of claim 1, wherein each of the two or more cams have harmonics of mutually exclusive orders.

7. The method of claim 1, wherein each of the two or more cams has a single harmonic.

8. The method of claim 1, wherein D) comprises:
   D1) determining a tip of the common axis of rotation.

9. The method of claim 1, wherein D) comprises:
   D1) determining a tilt of the common axis of rotation.

10. The system of claim 1 wherein for each cam, the one or more shape features defining harmonics cause harmonics along two axes perpendicular to the axis of rotation as well as along an axis parallel to the axis of rotation, the harmonics along the axis parallel to the axis of rotation creating a periodic displacement along the axis parallel to the axis of rotation as the shaft rotates.

11. A system for measuring shaft rotation angle, the system comprising:
    a shaft rotatable relative to an axis of rotation;
    a cam mechanism, coupled to the shaft, the cam mechanism having features defining at least one harmonic;
    a plurality of sensors positioned relative to the cam mechanism to determine a differential measurement at a particular sense angle defined by a position of the pairs of position sensors relative to the cam mechanism; and
    a processor configured to determine with a plurality of position sensors, a differential measurement at a particular sense angle defined by a position of the pairs of sensors relative to the axis of rotation,
    wherein the processor is configured to determine rotation along two axes perpendicular to the axis of rotation and for removing rotational components from the determined rotation along the two axes to determine a large shaft rotation anole.

12. The system of claim 11, wherein pairs of the plurality of position sensors are positioned within a plane substantially perpendicular to the axis of rotation and opposite each other relative to the cam mechanism.

13. The system of claim 12, wherein the processor is configured to determine a differential radial measurement at a particular sense angle defined by positions of a pair of sensors.

14. The system of claim 11, wherein the cam mechanism comprises a single cam having features defining a plurality of harmonics.

15. The system of claim 11, wherein the cam mechanism comprises a plurality of cams, each of the plurality of cams having features defining at least one harmonic, each harmonic being of a particular order; and
    the processor is further configured to analyze each of the differential radial measurements further determines at least one of a tip and a tilt of the common axis of rotation.

16. The system of claim 15, wherein each of the plurality of cams has harmonics of mutually exclusive orders.

17. The system of claim 16, wherein each of the plurality of cams can have a single harmonic.

18. The system of claim 16, wherein the particular orders of each of the harmonics are relatively prime.

19. The system of claim 16, wherein the particular orders of each of the harmonics are odd.

20. A system for measuring shaft rotation angle and runout, the system comprising:
    a shaft rotatable relative to an axis of rotation;
    a cam mechanism comprising a plurality of cams, each cam coupled to the shaft to rotate around the axis of rotation and having a shape defining at least one harmonic: in a plane perpendicular to the axis of rotation; and along an axis parallel to the axis of rotation such that rotating the cam mechanism causes a periodic displacement of a feature of each cam along the axis parallel to the axis of rotation;
    a plurality of sensors positioned radially around the shaft, each sensor including a read head pair comprised of two read heads positioned oppositely around one of the cams, the read heads offset from the plane perpendicular to the axis of rotation for said cam, each read head pair configured to measure a distance to said cam along a line between the read heads; and a processor configured to determine, from the distances measured by the read heads, the shaft rotation angle and runout.

* * * * *